United States Patent
Melvin et al.

(10) Patent No.: US 6,473,283 B1
(45) Date of Patent: Oct. 29, 2002

(54) VOLTAGE PROTECTION CIRCUIT FOR MULTI-DROP BUS OF AN AUTOMATED COIN VENDING MACHINE

(75) Inventors: Christopher L. Melvin, Katy, TX (US); Gary L. Mee, Houston, TX (US)

(73) Assignee: MP Electronics, Inc., Houston, TX (US)

( * ) Notice: Subject to any disclaimer, the term of this patent is extended or adjusted under 35 U.S.C. 154(b) by 0 days.

(21) Appl. No.: 09/481,440

(22) Filed: Jan. 12, 2000

(51) Int. Cl.[7] ................................. H02H 9/00
(52) U.S. Cl. .................... 361/91.1; 361/56; 361/111; 361/118
(58) Field of Search ................. 361/56, 91.1, 111, 361/91.2, 117, 118, 127, 120

(56) References Cited

U.S. PATENT DOCUMENTS

| | | | |
|---|---|---|---|
| 3,687,255 A | * 8/1972 | Johnson, II | 194/217 |
| 3,783,987 A | * 1/1974 | Hanert et al. | 194/216 |
| 4,023,071 A | 5/1977 | Fussell | 361/56 |
| 4,089,032 A | 5/1978 | Dell Orfano | 361/56 |
| 4,495,536 A | 1/1985 | Bynum | 361/91 |
| 4,584,622 A | 4/1986 | Crosby et al. | 361/56 |
| 4,656,554 A | 4/1987 | Maschek et al. | 361/56 |
| 4,698,721 A | 10/1987 | Warren | 361/110 |
| 4,802,055 A | 1/1989 | Beckerman | 361/56 |
| 5,274,527 A | * 12/1993 | Retzlaff | 361/118 |
| 5,379,176 A | 1/1995 | Bacon et al. | 361/106 |
| 5,398,798 A | * 3/1995 | Ericson | 194/202 |
| 5,436,786 A | 7/1995 | Pelly et al. | 361/56 |
| 5,548,462 A | 8/1996 | Uchida et al. | 361/18 |
| 5,587,685 A | 12/1996 | Johansson | 327/546 |
| 5,617,287 A | 4/1997 | Allina | 361/118 |
| 5,621,599 A | 4/1997 | Larsen et al. | 361/56 |
| 5,625,521 A | 4/1997 | Luu | 361/111 |
| 5,784,236 A | 7/1998 | Tardiff et al. | 361/56 |
| 5,786,972 A | * 7/1998 | Galipeau | 361/56 |
| 5,815,356 A | * 9/1998 | Rodriguez et al. | 361/91 |
| 5,946,178 A | * 8/1999 | Bijlenga | 361/91 |
| 6,118,639 A | * 9/2000 | Goldstein | 361/55 |

* cited by examiner

*Primary Examiner*—Stephen W. Jackson
(74) *Attorney, Agent, or Firm*—Gregory M. Luck; Sankey & Luck, L.L.P.

(57) ABSTRACT

A voltage protective circuit for an electronic device comprises a metal oxide varistor for eliminating spikes above a first level, and a Zener diode and a transistor connected in series through a resistor with the metal oxide varistor for eliminating spikes above a second level. The voltage protective circuit can be utilized in a separate, plug-in voltage protector for a vending machine with a multi-drop bus.

26 Claims, 1 Drawing Sheet

VOLTAGE PROTECTION CIRCUIT FOR MULTI-DROP BUS OF AN AUTOMATED COIN VENDING MACHINE

FIELD OF THE INVENTION

This invention relates to a voltage protector, and more particularly, to a voltage protection circuit for a coin changer/validator unit in a vending machine with a multi-drop bus.

BACKGROUND OF THE INVENTION

Automated coin vending machine manufacturers have adopted a set of standard interconnection protocols that control operations between machine controllers and various credit and money handling units in a vending machine. The standard, available from the National Automatic Merchandising Association, or NAMA, uses the multi-drop bus, or MDB, to connect the components of the vending machine, such as the coin changer/validator, to the machine controller. The bus supplies both power and communications data to the different components from the machine controller, thus allowing different components from different vendors to be interconnected and operate successfully together.

The NAMA voltage standard for the multi-drop bus establishes an acceptable range of voltages that can be supplied to the components of the vending machine without damage. However, the standard does not specify any power conditioning. As a result, spikes that occur on the power lines of the bus, especially when the AC power is suddenly cut off and then restored, can cause significant damage to the components of the vending machine, particularly the coin changer/validator. The internal power sources for the components, such as the coin changer/validator, afford only limited protection, and frequently fail adequately to protect the components against spikes on the power line. In addition, the multi-drop bus power supplies provide inadequate or no spike protection at all for the bus itself.

Accordingly, there is a need for a plug-in voltage protector for a multi-drop bus in a vending machine that can be added to any vending machine and protect the components of the machine from damaging spikes in power.

There is also a need for a voltage protector for a multi-drop bus in a vending machine that protects the multi-drop bus from damaging spikes in power.

There is a still further need for a voltage protector for a multi-drop bus in a vending machine that protects the coin changer/validator from damaging spikes in power.

SUMMARY OF THE INVENTION

In accordance with one aspect of the invention, a protective circuit for an electronic device includes two spike prevention circuits for preventing current spikes from flowing to the electronic device. The first spike prevention circuit prevents spikes above a first predetermined voltage from flowing to the electronic device. The second spike prevention circuit is connected in series after the first spike protection circuit and prevents current spikes above a second predetermined voltage from flowing to the electronic device.

In accordance with another aspect of the present invention, a voltage protective circuit for a component connected to a multi-drop bus in a vending machine includes an input terminal for inputting a first voltage from the multi-drop bus, an output terminal for outputting the first voltage to the component, and a line connecting the input and output terminals. Two spike prevention circuits are included in the line. The first spike prevention circuit prevents current spikes above a first predetermined voltage from flowing along the line to the component. The second spike prevention circuit is connected in series after the first spike protection circuit and prevents current spikes above a second predetermined voltage from flowing along the line to the component. The component may be a coin changer/validator in the vending machine.

In accordance with a further aspect of the present invention, a separate, plug-in voltage protector is connected between the DC power source and the multi-drop bus of a vending machine. The voltage protector protects at least one of the components of the vending machine from voltage spikes on the multi-drop bus from the DC power source. The protected component may be a coin changer/validator in the vending machine.

BRIEF DESCRIPTION OF THE DRAWINGS

The attached drawings illustrate preferred embodiments of the invention, in which.

DETAILED DESCRIPTION OF PREFERRED EMBODIMENTS

Figure 1:
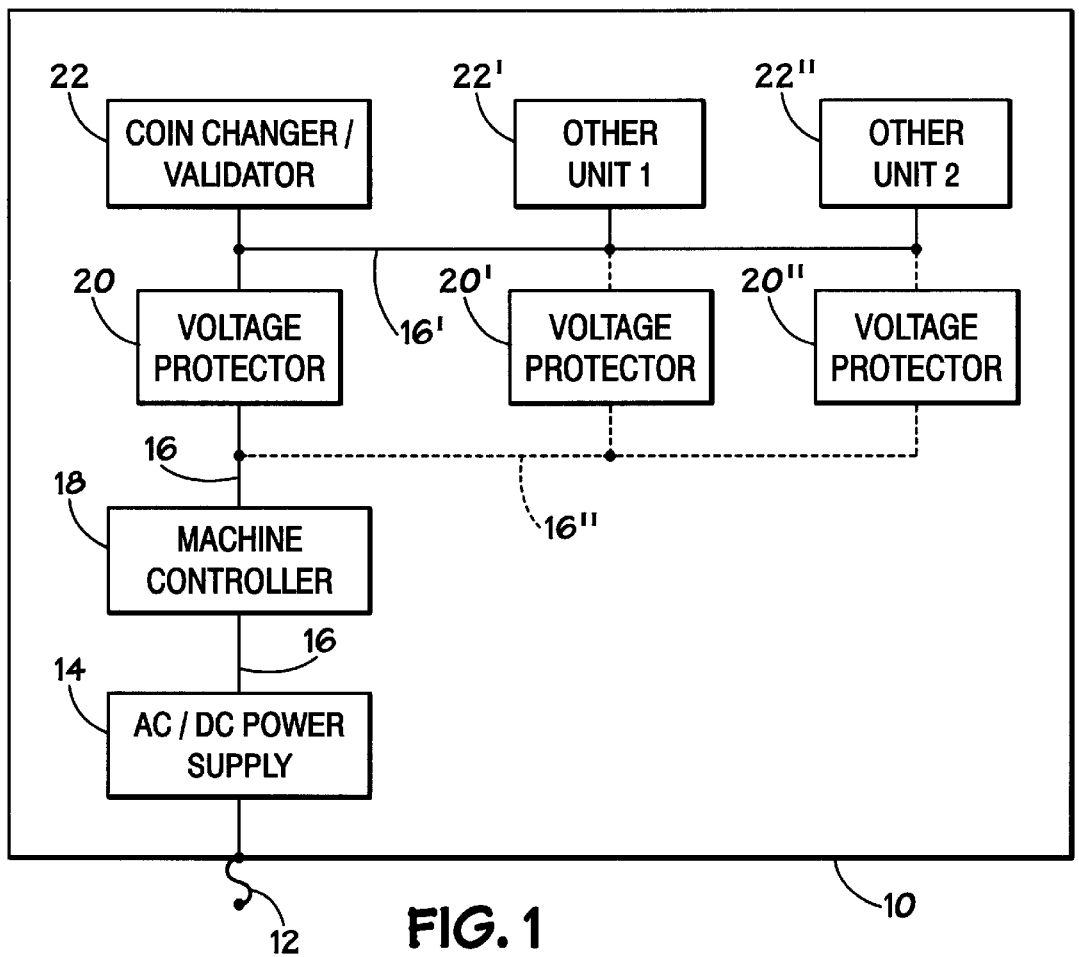
FIG. 1 is a block diagram of a vending machine.

Referring to the drawings, and initially to FIG. 1 thereof, there is shown a vending machine 10 connected to an external source of AC power 12. AC power from the source 12 is supplied to an AC to DC power supply 14 that converts the AC power to DC power, and supplies the DC power through a multi-drop bus (MDB) 16 to a machine controller 18. DC power from the machine controller 18 is supplied via the multi-drop bus 16 to a voltage protector unit 20 and thence, to a coin changer/validator 22 and other units or components 22', 22".

In the illustrated embodiment, the components 22, 22', 22" of the vending machine 10 are connected to the bus 16 at a portion denoted by reference numeral 16', and only one voltage protector unit 20 is included in the vending machine 10. In an alternate embodiment, each component 22,22', 22" can have a corresponding voltage protector unit 20, 20', 20" associated therewith. In such an instance, the voltage protector units 20, 20', 20" are connected to the bus 16 at a portion denoted by reference numeral 16" in lieu of the portion 16'. It is to be appreciated that the voltage protector units 20, 20', 20" are separate from the other components 22,22', 22" of the vending machine 10, and can be added to any vending machine 10 with a multi-drop bus 16.

Figure 2:
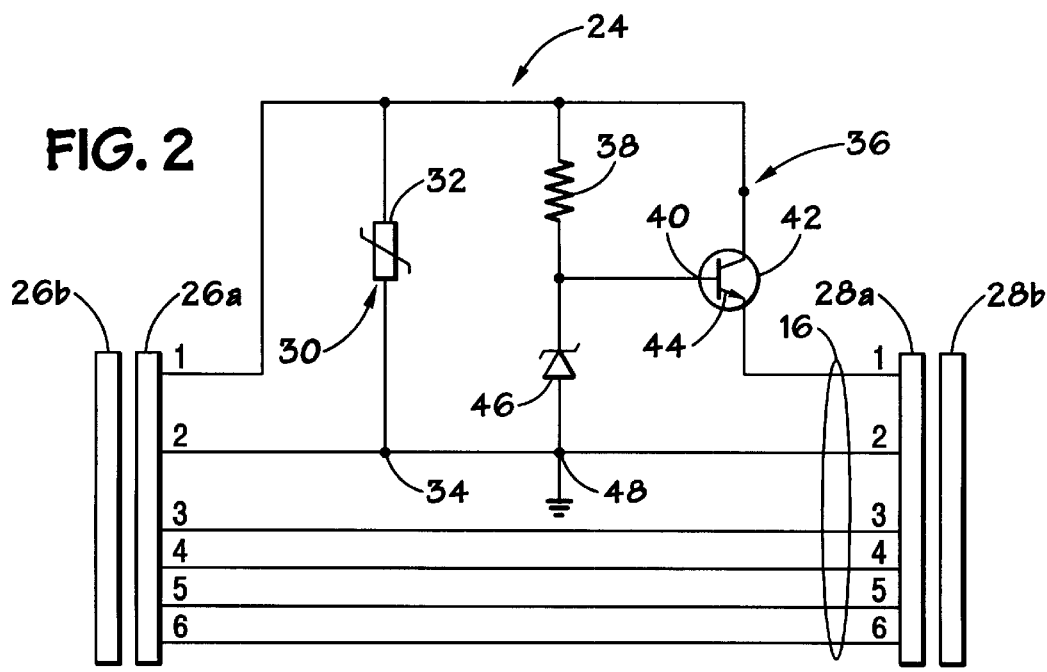
FIG. 2 is a schematic diagram of a voltage protection circuit in the vending machine of FIG. 1.

Turning now to FIG. 2, a voltage protector circuit 24 utilized in the voltage protector unit 20 is connected to the multi-drop bus 16 via a mating pair of standard bus connectors 26a, 26b, 28a, 28b. DC power is supplied on pins or lines 1 and 2 of the multi-drop bus 16. Pin or line 3 is a no connect line, while lines 4, 5 and 6 carry communications data. The standard bus connectors 26a, 26b, 28a, 28b allow the voltage protector circuit 24 to be a modular add-on in the vending machine 10, so that the components, such as the coin changer/validator 22, connected to the machine controller 18, can be easily plugged into the multi-drop bus 16.

DC power from the multi-drop bus 16 on line 1 is supplied to a first stage or shunt suppressor circuit 30 of the voltage protector circuit 24 and comprises a metal oxide varistor (MOV) transient suppressor 32 connected between line 1 and line 2 of the multi-drop bus 16. The metal oxide varistor 32 was, in a particular embodiment, selected to shunt to the power common or ground voltages that are greater than 60 volts. The metal oxide varistor 32 is normally not in conduction, but when a large voltage spike occurs on line 1, the metal oxide varistor 32 becomes conductive and shunts the spike to a power common or ground 34 on line 2.

A second stage or series regulator circuit 36 of the voltage protector circuit 24 follows the first stage 30 and comprises a resistor 38 coupled to the metal oxide varistor 32 and a base 40 of an NPN transistor 42. An emitter 44 of the transistor 42 is connected to the output of line 1. A transient suppressor Zener diode (TVS) 46 is connected in series with the resistor 38 to the base 40 of the transistor 42, and a power common or ground 48 on line 2.

The collector-emitter breakdown voltage of the transistor 42 has been selected to be greater than the normal clamping voltage of the metal oxide varistor 32. In one embodiment, the collector-emitter breakdown voltage of the transistor 42 was chosen to be 100 volts. The choice of a high breakdown voltage for the transistor 42 prevents input spikes on line 1 from breaking down the transistor 42 and flowing to the coin changer/validator 22 connected to the multi-drop bus 16.

It is to be appreciated that the beta of the transistor 42 amplifies the power for the multi-drop bus 16 when the power passes through the resistor 38 to the base 40 of the transistor 42. This is equivalent to the power on line 1 passing through a series resistor equal to the resistive value of the resistor 38 divided by the beta of the transistor 42.

The breakdown level of the transient suppressor Zener diode 46 is a preselected value, and in one embodiment, was chosen to be 38 volts, high enough to preclude the output power from the transistor 42 from rising above the maximum acceptable standard for the multi-drop bus 16. The value of the resistor 38 is determined from the difference between the breakdown voltages of the metal oxide varistor 32 and the transient suppressor Zener diode 46, and hence, the power handling capacity of the resistor 38.

In operation, voltage from line 1 of the multi-drop bus 16 is supplied to the metal oxide varistor transient suppressor 32. When a spike appears on line 1, and the voltage is above the shunt voltage of the metal oxide varistor transient suppressor 32, the metal oxide varistor transient suppressor 32 shunts the excess to the power common or ground 34. The first stage circuit 30 thus stresses a spike on input line 1 into the voltage limit of the metal oxide varistor transient suppressor 32.

However, the metal oxide varistor transient suppressor 32 may not remove all excessively high voltages from line 1, and a spike may still be on line 1. In this instance, the voltage of the spike is transmitted through transistor 42 until the voltage reaches the shunt voltage of the transient suppressor Zener diode 46. The transient suppressor Zener diode 46 then shunts the excess voltage to the power common or ground 48, thereby holding the voltage supplied to the base 40 of the transistor 42 to a constant level. Accordingly, the voltage appearing on line 1 at the emitter 44 of the transistor 42 remains constant, thereby eliminating the spike.

It will be appreciated that the second stage circuit 36 absorbs excess voltage on line 1 and converts it to heat. The second stage circuit 36 provides no additional stress to the voltage on line 1 when it is functioning.

It will be further appreciated that the second stage circuit 36 has two limits to its ability to protect. First, the transistor 42 can break down. Second, the heat from the second stage circuit 36, if not eliminated, can melt the transient suppressor Zener diode. So the second stage circuit 36 gently protects for small to moderate overvoltages, while the first stage circuit 30 protects the second stage circuit 36, the coin changer/validator 22 and the components 22, 22', 22" from higher voltages at the expense of the source.

It will be still further appreciated that the voltage protection circuit 24 of the present invention protects a component of the vending machine 10 such as the coin changer/validator 22 connected to the multi-drop bus 16 from large rapid transients and smaller, sustained over-voltage conditions. When the second stage circuit 36 is not eliminating a power spike, the second stage circuit 36 produces only a small voltage drop through the transistor 42.

The level for the shunt voltage for the first stage 30 is selected to be much higher than expected for a most spikes, and much higher than for a circuit that merely loads and stresses the DC power from the multi-drop bus 16. It is also selected to be higher than the shunt voltage for the second stage 36. As noted hereinbefore, in one exemplary embodiment, the shunt voltage for the first stage 30 was 60 volts, while the shunt voltage for the second stage was 38 volts. This is advantageous, as it permits the second stage 36 to protect at a lower voltage level than would otherwise be required. In addition, the second stage 36 does not add load to the supply while it protects against undesirable spikes.

It will be further appreciated that the second stage 36 of the voltage protection circuit 24 could be replaced by a suitable series regulator chip or circuit, and the invention would function as hereindescribed. In addition, the transistor 42 could be replaced by a Field Effect Transistor (FET) or other linear pass element.

For purposes of exemplification, particular embodiments of the invention have been shown and described according to the best present understanding thereof. However, it will be apparent that various changes and modifications in the arrangement and construction of the parts thereof may be made without departing from the spirit and scope of the invention as defined in the appended claims.

What is claimed is:

1. A voltage protective circuit for a component connected as a load to a multi-drop bus in a vending machine comprising:

a pair of input terminals coupled to said multi-drop bus;

a pair of output terminals coupled to said component;

a line connecting one of said input terminals to one of said output terminals;

first spike prevention means coupled between the pair of input terminals for preventing current spikes above a first predetermined voltage from flowing along said line to said component;

second spike prevention means connected in series with said line and after said first spike prevention means for preventing current spikes above a second predetermined voltage from flowing along said line to said component; and wherein said first spike prevention means comprises a shunt suppressor circuit.

2. A voltage protective circuit for a component connected as a load to a multi-drop bus in a vending machine comprising:

a pair of input terminals coupled to said multi-drop bus;

a pair of output terminals coupled to said component;

a line connecting one of said input terminals to one of said output terminals;

first spike prevention means coupled between the pair of input terminals for preventing current spikes above a first predetermined voltage from flowing along said line to said component;

second spike prevention means connected in series with said line and after said first spike prevention means for preventing current spikes above a second predetermined voltage from flowing along said line to said component, and wherein said second spike prevention means comprises a series regulator circuit.

3. The protective circuit of claim 2, wherein said series regulator circuit includes a constant voltage diode suppressor coupled to a transistor and ground.

4. The protective circuit of claim 3, wherein said transistor is coupled to said output terminal and said component.

5. The protective circuit of claim 4, and further comprising a resistor connected to said shunt suppressor circuit and said constant voltage diode suppressor.

6. The protective circuit of claim 5, wherein said shunt suppressor circuit comprises a metal oxide varistor.

7. The protective circuit of claim 6, wherein said constant voltage diode suppressor comprises a transient suppressor Zener diode with a shunt voltage equal to said second predetermined voltage.

8. The protective circuit of claim 7, wherein said transistor is an NPN type transistor, and the base of said transistor is connected to said resistor and said transient suppressor Zener diode, and the collector of said transistor is connected to said metal oxide varistor.

9. The protective circuit of claim 2, wherein said second spike prevention means comprises a series regulator circuit.

10. A voltage protective circuit for a coin changer/validator connected as a load to a multi-drop bus in a vending machine comprising:

a pair of input terminals coupled to said multi-drop bus;

a pair of output terminals coupled to said coin changer/validator;

a line connecting one of said input terminals to one of said output terminals;

first spike prevention means coupled between the pair of input terminals for preventing current spikes above a first predetermined voltage from flowing along said line to said coin changer/validator;

second spike prevention means connected in series with said line and after said first spike prevention means for preventing current spikes above a second predetermined voltage from flowing along said line to said coin changer/validator; and wherein said first spike prevention means comprises a shunt suppressor circuit.

11. A voltage protective circuit for a coin changer/validator connected as a load to a multi-drop bus in a vending machine comprising:

a pair of input terminals coupled to said multi-drop bus;

a pair of output terminals coupled to said coin changer/validator;

a line connecting one of said input terminals to one of said output terminals;

first spike prevention means coupled between the pair of input terminals for preventing current spikes above a first predetermined voltage from flowing along said line to said coin changer/validator;

second spike prevention means connected in series with said line and after said first spike prevention means for preventing current spikes above a second predetermined voltage from flowing along said line to said coin changer/validator; and wherein said second spike prevention means comprises a series regulator circuit.

12. The protective circuit of claim 11, wherein said transistor is coupled to said output terminal and said coin changer/validator.

13. The protective circuit of claim 12, and further comprising a resistor connected to said shunt suppressor circuit and said constant voltage diode suppressor.

14. The protective circuit of claim 13, wherein said shunt suppressor circuit comprises a metal oxide varistor.

15. The protective circuit of claim 14, wherein said constant voltage diode suppressor comprises a transient suppressor Zener diode with a shunt voltage equal to said second predetermined voltage.

16. The protective circuit of claim 15, wherein said transistor is an NPN type transistor, and the base of said transistor is connected to said resistor and said transient suppressor Zener diode, and the collector of said transistor is connected to said metal oxide varistor.

17. A vending machine comprising:

a DC power supply;

a machine controller coupled to the power supply;

a coin changer;

a multi-drop bus coupling the coin changer to the machine controller, said bus supplying DC electrical power over first and second conductors and supplying communications data over a third conductor; and a spike prevention circuit interposed along the multi-drop bus between the coin changer and the machine controller, said spike prevention circuit comprising:

a pair of input terminals and a pair of output terminals coupled to the first and second conductors of the multi-drop bus, a shunt suppressor coupled across the input terminals so as to be coupled between the first and second conductors of the multi-drop bus, and a series regulator coupled in series between respective input and output terminals so as to be coupled in series with one of the first and second conductors of the multi-drop bus.

18. The vending machine of claim 17 wherein the shunt suppressor of the spike prevention circuit becomes conductive in response to appearance across the input terminals of a voltage spike greater than a predetermined clamping voltage.

19. The vending machine of claim 18 wherein the shunt suppressor comprises a varistor.

20. The vending machine of claim 17 wherein the series regulator comprises a transistor having a first terminal coupled to said input terminal of said one of the first and second conductors of the multi-drop bus, a second terminal coupled to said output terminal that is coupled to said one of the first and second conductors of the multi-drop bus, and a third terminal coupled to a voltage control circuit that is coupled across the input terminals so as to be coupled between the first and second conductors of the multi-drop bus in parallel with the shunt suppressor; and wherein said voltage control circuit includes a transient suppressor component that shunts excess voltage so as to maintain the voltage supplied to the third terminal of the transistor at a constant level.

21. The vending machine of claim 20 wherein the shunt suppressor of the spike prevention circuit becomes conductive in response to appearance across the input terminals of a voltage spike greater than a predetermined shunt voltage and wherein the transient suppressor component of the voltage control circuit becomes conductive in response to appearance across the input terminals of a voltage spike greater than a predetermined shunt voltage that is lower than the predetermined shunt voltage of the shunt suppressor.

22. The vending machine of claim 17 wherein the series regulator includes a transistor establishing an output voltage across the output terminals in response to an input control voltage provided by a voltage control circuit coupled across the input terminals in parallel with the shunt suppressor, said voltage control circuit comprising a transient suppressor component that shunts excess voltage so as to maintain the voltage supplied to the transistor at a constant level.

23. The vending machine of claim 17 wherein the spike prevention circuit comprises a module that includes a first mating pair of bus connectors coupling the first and second conductors of a first segment of the multi-drop bus with the spike prevention circuit input terminals and a second mating pair of bus connectors coupling the first and second conductors of a second segment of the multi-drop bus with the spike prevention circuit output terminals.

24. A vending machine comprising:
 a DC power supply;
 a machine controller coupled to the power supply;
 a coin changer;
 a multi-drop bus coupling the coin changer to the machine controller, said bus supplying DC electrical power over first and second conductors and supplying communications data over a third conductor; and
 a spike prevention circuit interposed along the multi-drop bus between the coin changer and the machine controller,
 said spike prevention comprising:
  a pair of input terminals and a pair of output terminals coupled to respective segments of the first and second conductors of the multi-drop bus,
  a shunt suppressor coupled across the input terminals so as to be coupled between the first and second conductors of the multi-drop bus, said shunt compressor becoming conductive in response to appearance across the input terminals of the first and second conductors of the multi-drop bus of a voltage spike greater than a predetermined clamping voltage, and
  a series regulator coupled in series between an input terminal and a corresponding output terminal, said series regulator including a transistor establishing an output voltage at the output terminals in response to an input control voltage provided by a voltage control circuit coupled across the input terminals in parallel with the shunt suppressor, said voltage control circuit comprising a transient suppressor component that shunts excess voltage so as to maintain the voltage supplied to the transistor at a constant level.

25. The vending machine of claim 24 wherein the transient suppressor component of the voltage control circuit becomes conductive in response to appearance across the input terminals of a voltage spike greater than a predetermined shunt voltage that is lower than the predetermined shunt voltage of the shunt suppressor.

26. A spike prevention circuit adapted to be installed within a vending machine having a multi-drop bus supplying DC electrical power over first and second conductors and supplying communications data over a third conductor, said spike prevention circuit being adapted for installation along the multi-drop bus as a module and comprising:
 a pair of input terminals adapted to be coupled to the first and second conductors of a first segment of the multi-drop bus;
 a pair of output terminals adapted to be coupled to the first and second conductors of a second segment of the multi-drop bus to which a vending machine component is to be connected as a load;
 a shunt suppressor coupled across the input terminals, said shunt suppressor becoming conductive in response to appearance across the input terminals of a voltage spike greater than a predetermined clamping voltage;
 a series regulator coupled in series between an input terminal and a corresponding output terminal, said series regulator including a transistor establishing an output voltage across the output terminals in response to an input control voltage provided by a voltage control circuit coupled across the input terminals so as to be coupled between the first and second conductors of the multi-drop bus in parallel with the shunt suppressor, said voltage control circuit comprising a transient suppressor component that shunts excess voltage so as to maintain the voltage supplied to the transistor at a constant level;
 a first mating pair of bus connectors adapted for coupling the first and second conductors of a first segment of the multi-drop bus to the spike prevention circuit input terminals; and
 a second mating pair of bus connectors adapted for coupling the first and second conductors of a second segment of the multi-drop bus to the spike prevention circuit output terminals.

* * * * *